United States Patent [19]
Prigent et al.

[11] Patent Number: 5,355,240
[45] Date of Patent: Oct. 11, 1994

[54] OPTICAL COMMUNICATION LINK WITH CORRECTION OF NON-LINEAR EFFECTS AND OPTICAL SIGNAL PROCESSING METHOD

[75] Inventors: Laurence Prigent, Marcoussis; Olivier Audouin, Savigny sur Orge; Jean-Pierre Hamaide, ST Germain les Arpajon; José Chesnoy, Paris, all of France

[73] Assignee: Alcatel Cit, Paris, France

[21] Appl. No.: 937,698

[22] Filed: Sep. 1, 1992

[30] Foreign Application Priority Data

Sep. 6, 1991 [FR] France .............. 91 11077

[51] Int. Cl.⁵ .............................. H04B 10/18
[52] U.S. Cl. ..................... 359/161; 359/173; 359/174
[58] Field of Search ............ 359/111, 154, 161, 173, 359/174, 176, 176, 177, 179, 189, 194, 195

[56] References Cited

U.S. PATENT DOCUMENTS

| | | | |
|---|---|---|---|
| 4,947,134 | 8/1990 | Olsson | 359/173 |
| 5,055,795 | 10/1991 | Kasper et al. | 359/189 |
| 5,218,662 | 6/1993 | Dugan | 359/161 |
| 5,224,183 | 6/1993 | Dugan | 359/161 |
| 5,227,908 | 7/1993 | Henmi | 359/154 |

OTHER PUBLICATIONS

IEEE Photonics Technology Letters, vol. 2, No. 8, Aug. 1990, New York, US, pp. 585–587; A. H. Gnauck et al.: "Optical Equalization of Fiber Chromatic Dispersion in a 5-Gb/s Transmission System."

Primary Examiner—Wellington Chin
Attorney, Agent, or Firm—Sughrue, Mion, Zinn, Macpeak & Seas

[57] ABSTRACT

An optical communication link with correction of non-linear effects comprises an optical fiber transmission line subject to chromatic dispersion and non-linear effects and correction means for limiting the disadvantageous consequences of this dispersion and/or these non-linear effects. The correction means comprise at the output of the transmission line a dispersion compensator adapted to apply dispersion in the opposite direction to and of lower absolute value than the dispersion due to the transmission line.

9 Claims, 2 Drawing Sheets

OPTICAL COMMUNICATION LINK WITH CORRECTION OF NON-LINEAR EFFECTS AND OPTICAL SIGNAL PROCESSING METHOD

BACKGROUND OF THE INVENTION

1. Field of the invention

The present invention concerns implementing an optical communication link when transmission of information over the link is subject to non-linear effects to the degree that correction of such effects is necessary. A link of this kind is typically a long-haul link such as an intercontinental link which can be from around 3 000 to 10 000 km long or even longer.

However, the present invention may be relevant to shorter links if they have a high mean optical power rating. To be more precise the invention applies when the integral of the power over the length of the line: $\int P.dl$, has high values producing non-linear effects capable of producing unacceptable transmission errors.

2. Description of the Prior Art

A known link of this kind comprises elements which are common to it and to a link in accordance with the present invention: these firstly comprise a transmission line in the form of an optical fiber having a normal direction chromatic dispersion less than 1 and preferably less than 0.5 ps/nm.km so that the dispersion of the line as a whole distorts a transmitted signal. This line is provided with optical amplifiers distributed over its length so that an optical signal guided by the fiber has locally increased amplitudes producing non-linear effects which further distort the signal.

These common elements secondly comprise means for correcting the optical signal which receive the line output signal and correct it to obtain a corrected optical signal closer to the line input signal. These signal correction means comprise an output filter adapted to filter optical frequencies. The bandwidth of this filter constitutes a corrective filtering bandwidth.

These common elements finally comprise optical signal processing means for receiving the corrected signal and for extracting therefrom the information to be transmitted which was conveyed by the input signal. The extracted information is inevitably affected by errors. The corrective filtering bandwidth is chosen to minimize the error rate.

In a first known long-haul link the corrective filtering bandwidth is very narrow. The aim is to eliminate as much as possible of the spectral components due to the non-linear effects. This bandwidth is 20 GHz, for example, that is to say 0.16 nm.

This first known long-haul link is described in the Journal of lightwave technology, vol 9, No 3, March 1991, (D. Marcuse).

A second known long-haul link is described in an article by N. Henmi et al "Dispersion compensation by prechirp technique in multigigabit optical amplifier repeater systems" ("Topical Meeting on Optical Amplifiers and Their Applications", August 1990).

A particular object of the present invention is to enable simple implementation of a link of this kind having a reduced error rate and/or an increased bit rate.

SUMMARY OF THE INVENTION

The present invention consists in an optical communication link with correction of non-linear effects comprising an optical fiber transmission line subject to chromatic dispersion and non-linear effects and correction means for limiting the disadvantageous consequences of said dispersion and/or said non-linear effects comprising at the output of said transmission line a dispersion compensator adapted to apply dispersion in the opposite direction to and of lower absolute value than said line dispersion.

According to the present invention some of the additional spectral components due to the non-linear effects are not eliminated by the output filter as in the first known long-haul link previously mentioned. Instead, in conjunction with the dispersion compensator, they are used to generate a corrected signal of improved quality.

Note that using a dispersion compensator in the form of an optical fiber at the output of a transmission line has already been proposed in an article by K. Hagimoto et al "A 17 Gb/s long-span fiber transmission experiment using a low noise broad-band receiver with optical amplification with equalization" ("Topical Meeting on Optical Amplifiers and Their Applications", August 1990).

This was a link of medium length (150 km).

On a medium length link of this kind the non-linear effects are negligible and the line fibers used are relatively inexpensive and have relatively high dispersions, in the order of 1 ps/nm.km. On these links the distortion of the output signal is therefore simple chromatic distortion and there are virtually no additional spectral components.

How the present invention may be put into effect will now be described in more detail by way of non-limiting example with reference to the appended diagrammatic drawings.

DETAILED DESCRIPTION OF THE INVENTION

Figure 1:
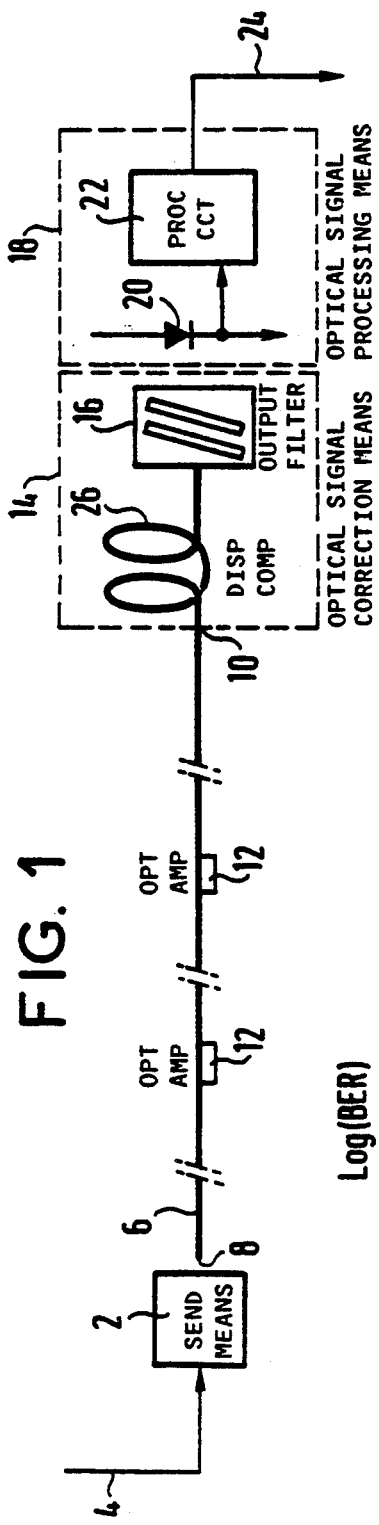
FIG. 1 shows an overall view of a link in accordance with the present invention.

The FIG. 1 link comprises various elements which, in terms of the functions to be described, are common to it and the first known long-haul link previously mentioned.

These common elements are:

Send means 2 receiving an electrical input signal over an electrical conductor 4 and forming in response an optical line input signal conveying information to be transmitted.

A transmission line 6 having an input 8 to receive this line input signal and an output 10 for supplying a line output signal resulting from the transmission of this input signal. This line has a length exceeding 3 000 km, for example. It comprises an optical fiber having a normal direction chromatic dispersion less than 0.5 ps/nm.km, for example, so that the line as a whole has a line dispersion. It is fitted with optical amplifiers 12 distributed along its length so that an optical signal guided by the fiber has locally increased amplitudes causing non-linear effects. These effects broaden the spectrum of the signal by adding spectral components. As a result, as compared with the line input signal the line output signal is subject not only to simple chromatic distortion resulting from the effect on the input signal of the line dispersion but also to composite distortion resulting from the effect of the line dispersion on these added spectral components.

Optical signal correction means 14 for receiving the line output signal and processing it to obtain a corrected optical signal closer to the line input signal. These signal correction means comprise an output filter 16 adapted to filter optical frequencies and having a bandwidth which constitutes a corrective filtering bandwidth.

Optical signal processing means 18 for receiving this corrected signal and for extracting from it the information to be transmitted which was conveyed by the input signal. This information is affected by errors, said corrective filtering bandwidth being chosen to minimize the error rate. These optical signal processing means comprise a detector 20 supplying a detected electrical signal to processing electronic circuits 22 which supply a link output signal on an electrical line 24. It is this link output signal which restores the information to be transmitted and the link error rate is measured on this signal.

In accordance with the present invention the signal correction means 14 further comprise a dispersion compensator 26 having a dispersion of the same magnitude but the opposite direction to the line dispersion, the absolute value of this compensating dispersion being less than that of said line dispersion, the difference between these two values constituting a compensation deficit which is chosen to be close to an optimum compensation deficit minimizing said error rate.

Figure 3:
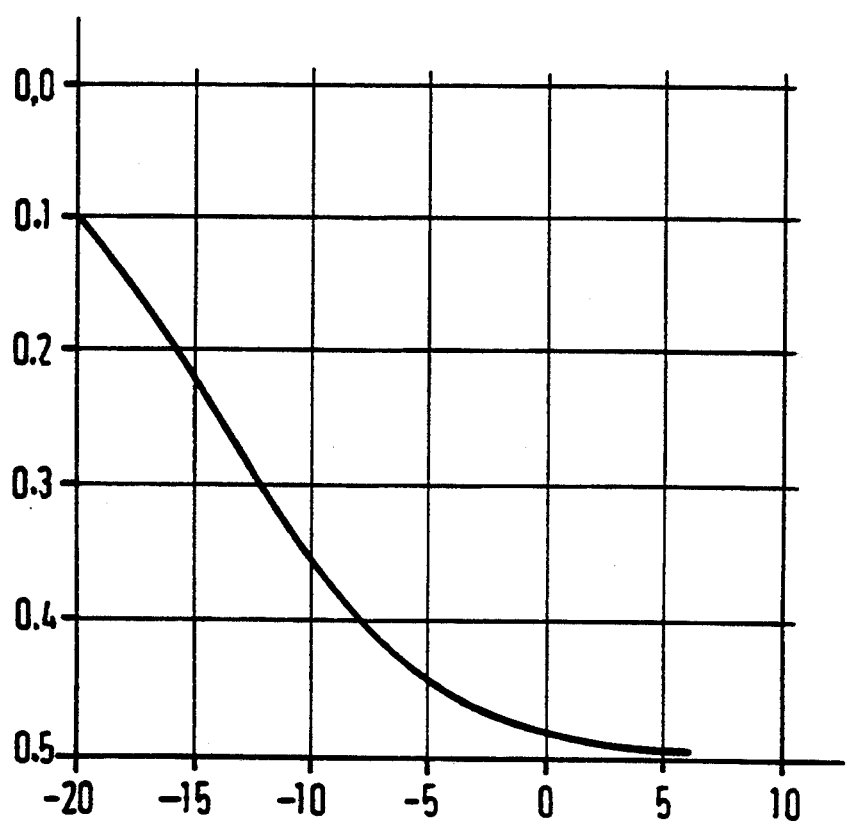
FIG. 3 is a diagram showing the optimum compensation deficit variation as a function of medium power.

It is possible to define a relative compensation deficit consisting of the ratio of the compensation deficit to the transmission dispersion. This relative compensation deficit is greater than 5% and preferably between 5 and 80%, the optimal value of this deficit depending on the mean power rating of the line, as shown in FIG. 3.

The corrective filtering bandwidth is preferably between 0.2 and 0.9 nm and advantageously in the range 0.25–0.6 nm.

As in the known medium-range link previously mentioned, the dispersion compensator is preferably an optical fiber having a dispersion greater in absolute value than ten times the line dispersion.

It will be understood that the link that has just been described applies to the line output signal processing which can be applied with advantage whenever an optical signal conveys information to be transmitted and is subject to non-linear effects and to chromatic dispersion. Using this method, to recover the information with a minimum error rate there is applied to the signal compensating chromatic dispersion in the direction opposite to and of lower absolute value than said line dispersion.

Figure 2:
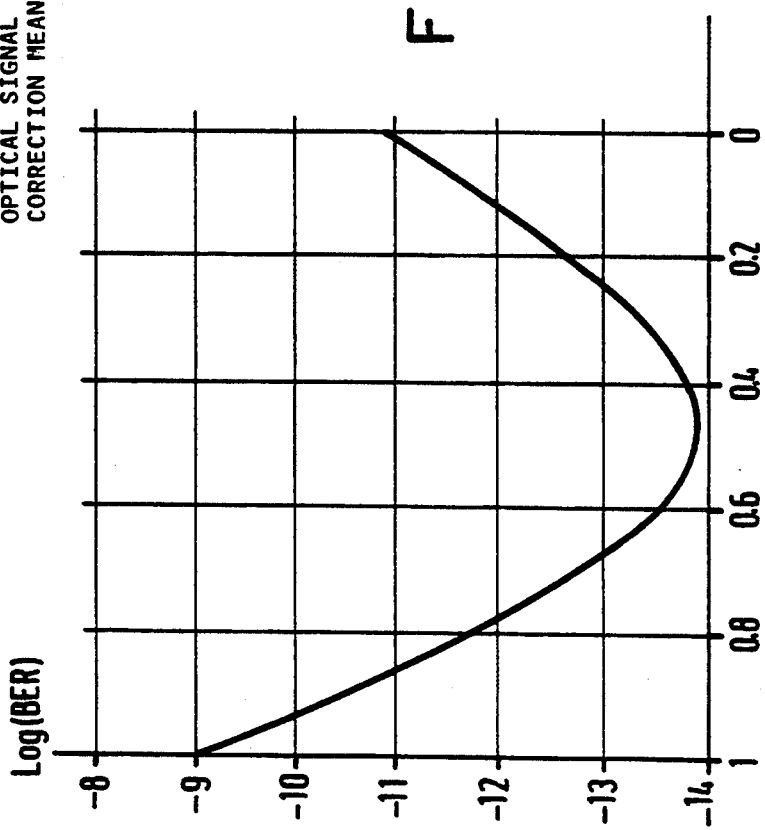
FIG. 2 is a diagram showing the variation of the transmission error rate as a function of a relative compensation deficit on a link of this kind.

The diagrams in FIGS. 2 and 3 were obtained by digital simulation. The horizontal axis of the FIG. 2 diagram represents a relative compensation deficit that can be applied at the output of a line of this kind. The vertical axis represents the logarithm of the transmission error rate achieved when the link comprises amplifiers spaced by 50 km for an output power of 2.5 dBm representing a mean power rating of −6.6 dBm. It shows an optimal relative compensation deficit minimizing the error rate and in this example close to 0.45. The horizontal axis of the FIG. 3 diagram plots the mean power rating of a line of this kind and the vertical axis plots the corresponding optimum relative compensation deficit.

There is claimed:

1. Optical communication link with correction of non-linear effects comprising an optical fiber transmission line subject to chromatic dispersion and non-linear effects and correction means for limiting the disadvantageous consequences of said dispersion and/or said non-linear effects comprising at the output of said transmission line a dispersion compensator adapted to apply dispersion in the opposite direction to and of lower absolute value than said line dispersion.

2. Link according to claim 1 comprising send means for forming a line input optical signal conveying information to be transmitted and a transmission line having an input for receiving said line input signal and an output for supplying a line output signal resulting from the transmission of said input signal, said line having a length exceeding 3 000 km and comprising an optical fiber having a normal direction chromatic dispersion of less than 1 ps/nm.km so that said line as a whole has a line dispersion, said line being provided with optical amplifiers distributed over its length so that an optical signal guided by said fiber has locally increased amplitudes causing non-linear effects which broaden the spectrum of the signal by adding spectral components, said line output signal, as compared with the line input signal, being affected not only by simple chromatic distortion resulting from the effect on the input signal of the line dispersion but also and more importantly by composite distortion resulting from the effect of the line dispersion on the additional spectral components, said link further comprising optical signal correction means for receiving the line output signal and processing it to obtain a corrected optical signal closer to the line input signal, said signal correction means comprising an output filter adapted to filter optical frequencies and having a bandwidth which constitutes a corrective filtering bandwidth, said link comprising optical signal processing means for receiving said corrected signal and extracting from it the information to be transmitted which was conveyed by the input signal, said information being affected by errors, said corrective filtering bandwidth being chosen to minimize the error rate, said signal correction means further comprising a dispersion compensator having a dispersion of the same magnitude but the opposite direction to said line dispersion, the absolute value of said compensating dispersion being less than that of said line dispersion, the difference between said two values constituting a compensation deficit which is chosen to be close to an optimum compensation deficit minimizing said error rate.

3. Link according to claim 2 wherein said corrective filtering bandwidth is greater than 0.2 nm.

4. Link according to claim 3 wherein said corrective filtering bandwidth is between 0.2 and 0.9 nm.

5. Link according to claim 4 wherein said corrective filtering bandwidth is in the range 0.2–0.6 nm.

6. Link according to claim 1 wherein a relative compensation deficit consisting of the ratio of said compensation deficit to said line dispersion has a value exceeding 5%.

7. Link according to claim 6 wherein said relative compensation deficit has a value between 5 and 80%.

8. Method of processing an optical output signal which conveys information to be transmitted and which is subject to non-linear effects and chromatic dispersion due to the transmission line wherein there is applied to said signal compensating dispersion of opposite sign to said dispersion due to the transmission line in such a way as to leave a non-null compensation deficit in respect of the chromatic dispersion affecting said signal.

9. Method according to claim 8 wherein said compensation deficit is between 5 and 80% of the dispersion due to the transmission line.

* * * * *